United States Patent [19]

Ito et al.

[11] Patent Number: 4,901,592
[45] Date of Patent: Feb. 20, 1990

[54] SHOCK ABSORBING STEERING APPARATUS

[75] Inventors: Nobuyoshi Ito; Toshiyuki Nagashima; Mitsuo Ichikawa, all of Maebashi; Mikio Yamaguchi, Takasaki, all of Japan

[73] Assignee: Nippon Seiko Kabushiki Kaisha, Tokyo, Japan

[21] Appl. No.: 234,139

[22] Filed: Aug. 19, 1988

[30] Foreign Application Priority Data

Jun. 17, 1988 [JP] Japan ............................ 63-80391[U]

[51] Int. Cl.$^4$ ............................................. B62D 1/18
[52] U.S. Cl. ......................................... 74/492; 74/493; 188/371; 280/777
[58] Field of Search .................. 74/492, 493; 280/777, 280/775; 188/371

[56] References Cited

U.S. PATENT DOCUMENTS

| | | | |
|---|---|---|---|
| 3,600,971 | 8/1971 | Scarvelis | 74/492 |
| 4,330,139 | 5/1982 | Katayama | 74/493 X |

FOREIGN PATENT DOCUMENTS

| | | | |
|---|---|---|---|
| 2604214 | 8/1977 | Fed. Rep. of Germany | 74/492 |
| 2821707 | 11/1978 | Fed. Rep. of Germany | 280/777 |
| 59-46828 | 11/1984 | Japan . | |
| 60-127285 | 8/1985 | Japan . | |
| 62-187652 | 8/1987 | Japan | 74/492 |
| 63-46972 | 2/1988 | Japan | 74/492 |

Primary Examiner—Allan D. Herrmann
Attorney, Agent, or Firm—Shapiro and Shapiro

[57] ABSTRACT

A shock absorbing steering apparatus has a steering column having a steering shaft pivotably supported thereon, a distance bracket secured to the column, and a column bracket for fixing the column to a vehicle body through the distance bracket. The steering apparatus further has a curling plate provided between a fastening bolt inserted in the distance bracket and the column bracket, and a curling plate bent portion controlling guide member secured to the column side for containing the curling plate and restraining the U-shaped bent portion thereon. That portion of the distance bracket in which the fastening bolt is inserted is opened to the steering wheel side, and the curling plate, when shocked, has its U-shaped bent portion plastically deformed and moved while being restrained by the guide member, thereby absorbing shock energy.

13 Claims, 3 Drawing Sheets

SHOCK ABSORBING STEERING APPARATUS

BACKGROUND OF THE INVENTION

1. Field of the Invention

This invention relates to a steering apparatus having a shock absorbing function for protecting the driver of a vehicle from injury during a collision of the vehicle, and in particular to a shock absorbing steering apparatus in a tilt type steering apparatus in which a column is angularly adjustable with respect to the vertical direction of a vehicle.

2. Related Background Art

As a shock absorbing steering apparatus having a tilt mechanism, there has heretofore been proposed one as shown, for example, in Japanese Utility Model Application Laid-open No. 60-127285 wherein a bellows-shaped or tear-deformably shaped shock energy absorbing member is mounted between the fastening bolt of a distance bracket and a hang pawl portion in the lower portion of a column. The construction of this example of the prior art will hereinafter be described with reference to FIGS. 6 to 9 of the accompanying drawings. A pair of column brackets 21 secured to a vehicle portion 10 by a mounting portion 21t with the body 21h thereof facing the vehicle portion are formed with slots 21a for tilt extending vertically in the lower half of said body 21h, and a distance bracket 22 secured to the underside of a column 6 is embraced by the body 21h. U-shaped cut-aways 22u opening rearwardly (toward the steering wheel side) are formed in opposed relationship with the opposite side walls 22k of the distance bracket 22, and a fastening bolt 23 is provided through the cut-aways 22u and the slots 21a for tilt. The nut portion 24n of a tilt lever 24 is threadably engaged with the threaded portion of the bolt 23, and by the fastening thereof, the distance bracket 22 may be urged against and fixed to the column brackets 21. The portion of shank 23b adjacent the head 23t of the fastening bolt 23 is formed with a square cross-section within a dimensional range somewhat smaller than the thickness of the column brackets 21. This portion, 23s, bears against the inner surface of the slots 21a for tilt, to thereby prevent rotation of the fastening bolt 23 during the fastening by the tilt lever 24.

A shock energy absorbing member 25 forms a corrugated or bellows-like structure and is provided with upright side walls 25k formed in facing relationship with each other on the opposite sides of one end portion thereof and having holes 25a for the fastening bolt. Member 25 is formed at the center of the other end portion thereof with a hooking slot 25n adapted to be hooked by a hang pawl 26 formed on the underside of the column 6, and the central portion of the shock energy absorbing member provides a corrugated energy absorbing portion 25e which is disposed between the fastening bolt 23 and the hang pawl 26.

When there occurs collision of the vehicle, the driver's body shockingly strikes against the steering wheel 1 by reaction, and therefore, the collapsibly constructed steering shaft 2 starts to collapse. More particularly, the end surface of the steering wheel 1 strikes against the upper end surface of the column 6, whereby the column 6 is pushed forwardly (leftwardly) downwardly. At this time, the distance bracket 22 secured to the column 6 cannot prevent slip from occurring between it and the column bracket 21 because the distance bracket 22 is such that the fastening bolt 23 is fitted in the upwardly opening U-shaped cut-aways 22u. Consequently, the hang pawl 26 moving forward with the column 6 bears against the front of the hooking slot 25n of the energy absorbing member 25, so that the energy absorbing member 25 coupled to the fastening bolt 23 by the hole 25a has its corrugated energy absorbing portion 25e stretched as shown in FIG. 9 and thereby absorbs the shock energy by the plastic deformation thereof.

The above-described shock energy absorbing steering apparatus for the tilt mechanism, as compared with one of the type in which an energy absorbing portion is provided between a vehicle body and a column bracket (for example, Japanese Patent Application Laid-open No. 55-68471), has the advantage that it can reduce the maximum peak load and can correspondingly decrease the shock load received by the driver because a great moment load $W \times L$, where W is the transmitted force from the steering wheel and L is the distance between the mounting flange portion of the column bracket and the fastening bolt, does not act on the column disengaging portion, i.e., the column bracket 21t. However, where such as corrugated energy absorbing member is merely hooked between the fastening bolt 23 of the distance bracket 22 and the hang pawl 26 of the column 6 side, friction sounds or shock contact sounds will be produced by vibrations or the like of the running vehicle body. Also, the corrugated plate-like member is stretched by the shock load in order to absorb the shock energy, and therefore, it is difficult to obtain a desired energy absorbing characteristic.

It is particularly difficult to obtain such an absorbing characteristic that the energy absorbing load immediately after shock is made small and thereafter the load is gradually increased along a desired curve. The corrugated energy absorbing member has no means for controlling the plastically deformed state thereof, and this leads to the problem that it is difficult for the plastic deformation resistance of the energy absorbing member to become substantially constant for the movement stroke of the column.

SUMMARY OF THE INVENTION

The present invention provides a steering apparatus having a steering column having a steering shaft pivotably supported thereon, a distance bracket secured to said column, and a column bracket for fixing said column to a vehicle body through said distance bracket, wherein said steering apparatus has a shock energy absorbing U-shaped curling plate having first and second plate portions and a bent portion integrally connecting the first and second plate portions, the first and second plate portions being secured to the column and the column bracket at their respective ends, whereby said shock energy absorbing plate, when shocked, is plastically deformed so that the bent portion may be moved, thereby absorbing energy.

In a preferred embodiment, the first and second plate portions are extended substantially along the column, and the steering apparatus further comprises a guide member secured to said column for restraining said first and second plate portions of said U-shaped plate, whereby, when shocked, the U-shaped plate is deformed while being restrained by the guide member.

In such a structure, when collision occurs, the steering column and the curling plate are restrained by a predetermined or greater movement of the steering column, and the curling plate moves obliquely downwardly with the steering column and is plastically deformed to absorb the shock energy while being controlled by the curling plate guide member. The plastically deformable portion, i.e., the U-shaped bent portion, of the curling plate is restrained between the column and said guide member and has its vertical bulging controlled thereby and thus, plastic deformation progresses in the lengthwise direction of the curling plate at a predetermined rate. Also, the curling plate has its plate width gradually increased toward the side on which the plastic deformation progresses, with respect to the lengthwise direction thereof, and therefore, as the plastically deformable portion moves, the deformation load gradually increases and the shock force imparted to the driver can be kept substantially constant to thereby bring about absorption of great energy.

DESCRIPTION OF THE PREFERRED EMBODIMENTS

Some embodiments of the present invention will hereinafter be described with reference to the drawings.

Figure 6:
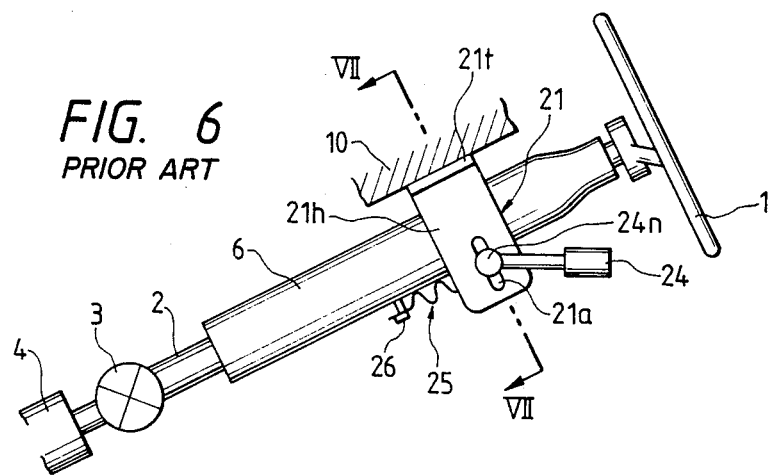
FIG. 6 is a side view of a tilt steering apparatus having a shock energy absorbing portion according to the prior art.
Figure 7:
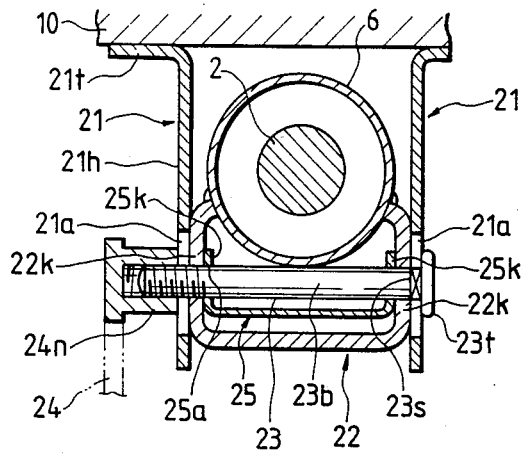
FIG. 7 is an enlarged cross-sectional view taken along line VII—VII of FIG. 6.
Figure 8:
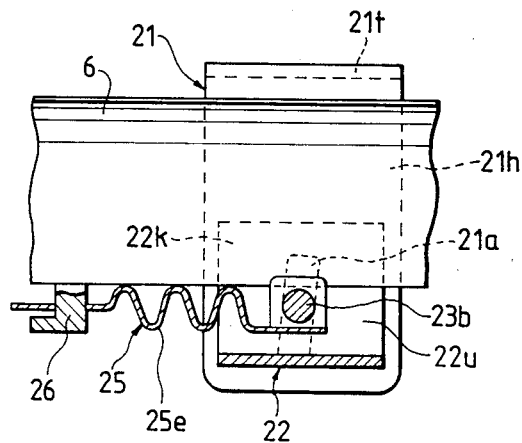
FIG. 8 is a side cross-sectional view of the essential portions of a steering apparatus having a corrugated energy absorbing member according to the prior art.
Figure 9:
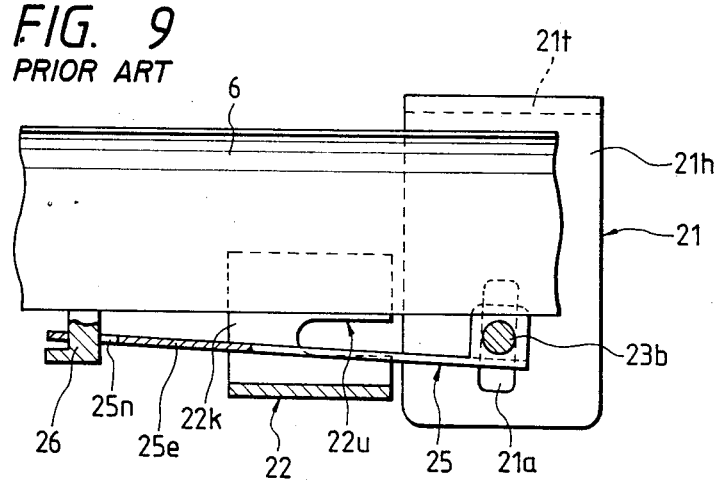
FIG. 9 is a side cross-sectional view showing the state of the steering apparatus of FIG. 8 after plastically deformed.

The tilt mechanism of a steering apparatus applied to the present embodiment is substantially the same as that described with respect to the prior art of FIGS. 6 and 7, and similar portions are given similar reference characters and need not be described in detail.

Figure 1:
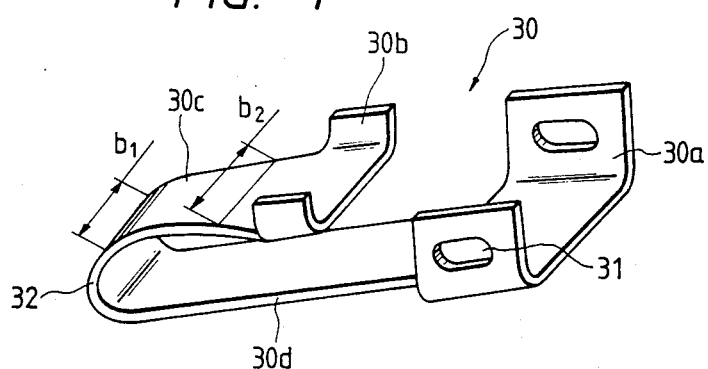
FIG. 1 is a perspective view of a curling plate according to an embodiment of the present invention.

A curling plate 30 in the present embodiment, as shown in FIG. 1, has one end (rear end) thereof formed in a U-shape, and the two arms of this U-shaped portion 30a are formed with slots 31 extending in the lengthwise direction of the plate. The other end (fore end) of the curling plate 30, as will be described later, is U-shaped so as to be fixed to a steering column with the side portion of the column interposed between its two arms. The intermediate part of the portion from the fore end thereof to the rear end is bent back into a U-shape at 32. The portion 30c from this U-shaped bent portion 32 to the U-shaped end portion 30b is a plastically deformable portion. The plastically deformable portion 30c has a width dimension $b_2$ at a portion adjacent to the U-shaped end portion 30b, and gradually decreases in width therefrom and has a width dimension $b_1$ at the intermediate turned-back portion (the U-shaped bent portion 32), wherefrom the plate has the same width dimension to the U-shaped portion 30a of said rear end.

Figure 2:
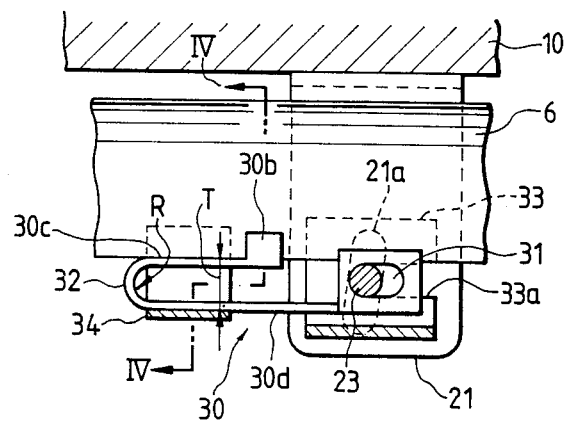
FIG. 2 is a schematic side view of a first embodiment of the present invention.

Referring to FIG. 2, a distance bracket 33 secured to the steering column 6 has in the opposite sides thereof cut-away grooves 33a cut away substantially parallel to the column 6 from the center toward the rearward (rightward) side edges. Also, a column bracket 21 mounted to a vehicle body portion 10 so as to embrace the distance bracket 33 from the outside thereof is formed with vertically extending slots 21a for tilt intersecting the cut-away grooves 33a of the distance bracket 33. A fastening bolt 23 is inserted in these cut-away grooves 33a and slots 21a for tilt and through the slots 31 of the U-shaped portion 30a of the rear end of the curling plate 30. The nut portion (see FIG. 7) of a tilt lever (not shown) is threadably engaged with the tip end of the fastening bolt 23. In the normal condition wherein no collision occurs, the fastening bolt 23 is inserted in the slots 31 of the curling plate 30 so as to contact with the forward side edge portions of said slots, and in this state, the U-shaped portion 30b of the fore end of the plate 30 is secured to the column 6, as by welding, in proximity to the fore edge of the column bracket 21, as shown in FIG. 2.

A curling plate bent portion controlling guide member 34 which is U-shaped in the illustrated embodiment is secured to the both sides of the column 6 at the position of said plastically deformable portion 30c of the curling plate 30, as by welding, in such a manner as to embrace the curling plate 30. A lower side portion 30d joined to the U-shaped portion 30a of the rear end of the curling plate is in contact with said guide member 34, and the upper side portion thereof, i.e., the plastically deformable portion 30c, bears against the lower side portion of the column 6, whereby the curling plate 30 is controlled so that the radius of curvature R of the bent portion thereof and the spacing T between said lower side portion 30d and said plastically deformable portion 30c are kept constant.

Figure 3:
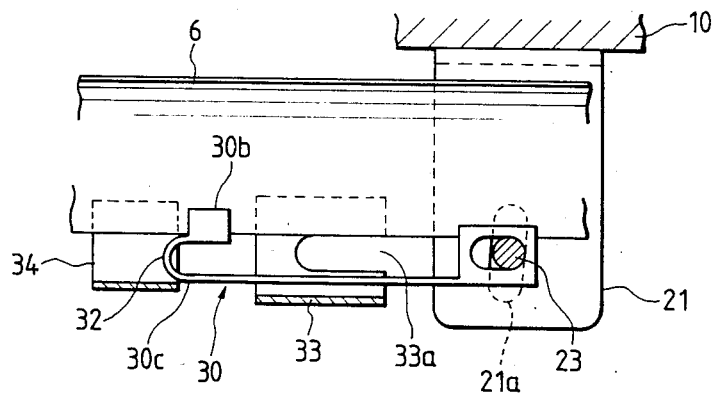
FIG. 3 is a side view showing the state of the curling plate after plastically deformed in the embodiment shown in FIG. 2.

In such a construction, when the vehicle collides, the column 6 and the curling plate 30, with the distance bracket 33, are moved forward relative to the fastening bolt 23 by an amount corresponding to the range of the slots 31 of the plate, by so-called secondary collision. Further, by the applied shock, the distance bracket 33 is moved forward (leftward in FIG. 2) with the cut-away grooves 33a coming out of the fastening bolt 23. At the same time, by the movement of the column 6 in the same direction, the curling plate 30 has the U-shaped portion 30b of the fore end thereof strongly pulled by the column 6, and the plastically deformable portion 30c is deformed and stretches forward while absorbing the energy of the shock, whereupon the U-shaped bent portion 32 becomes proximate to the U-shaped portion 30b of the fore end of the plate. FIG. 3 shows this state.

During the deformation of the plastically deformable portion 30c, the curvature of the U-shaped bent portion 32 is maintained by the curling plate bent portion controlling guide member 34 as previously described, while the width dimension of the curling plate at the U-shaped bent portion gradually increases from its pre-collision minimum ($b_1$) as the bent portion 32 shifts toward the fore end of the plate. Consequently, the collision energy is absorbed reliably and stably at a desired rate of increase prescribed by the increase in the width dimension of the curling plate 30 at the bent portion. The slots 31 in the U-shaped portion 30a of the rear end of the curling plate 30 are phase shifting slots for reducing the peak load immediately after collision, but are not requisite to the present invention, and may be mere circular holes in some cases.

Figure 4:
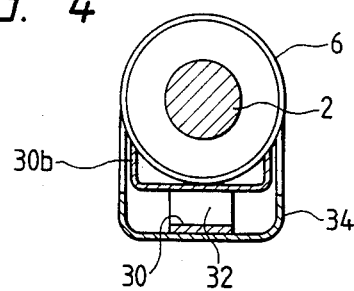
FIG. 4 is a cross-sectional view taken along line IV—IV of FIG. 2.
Figure 5:
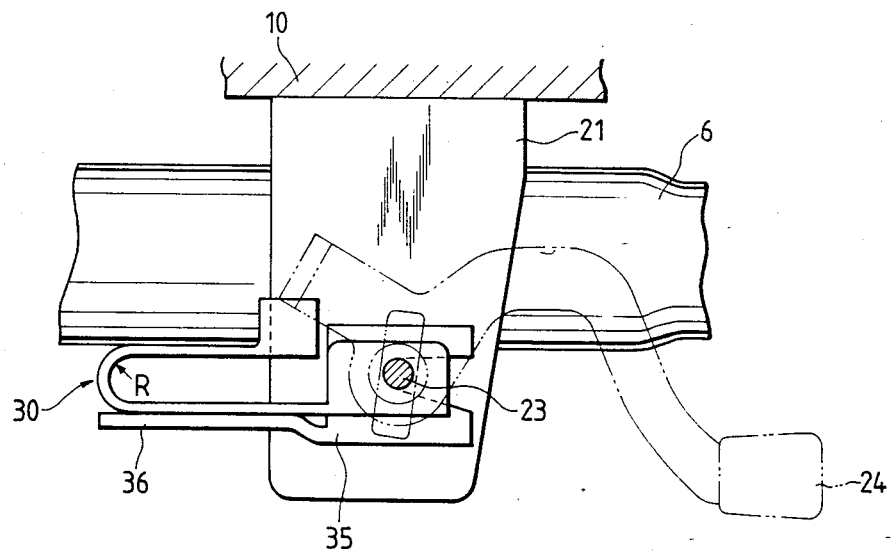
FIG. 5 is a fragmentary side view of a second embodiment of the present invention.

In the above-described embodiment, the curvature of the U-shaped bent portion 32 of the curling plate 30 being plastically deformed is held constant and the width dimension of the plastically deformable portion 30c of said plate is varied so that the deformation load increases gradually. However, the present invention is not restricted to such a form. For example the underside of the bent portion controlling guide member 34 may be inclined in the lengthwise direction of the column 6 (so that the forward (left) side may be widened) and the radius of curvature R of the curling plate may be controlled so as to be great during the early period of collision and become smaller as the deformation progresses, whereby a gradual increase in the deformation load may be achieved. The bent portion controlling guide member 34 need not always be a separate member secured to the column 6, but as in the embodiment of FIG. 5, the fore end of the distance bracket 35 may be extended along the underside of the column 6 and this extended portion may provide a curling plate controlling guide portion 36. The shape thereof is not limited to the U-shape as shown in FIG. 4. The means for securing the curling plate, the distance bracket or the bent portion controlling guide member to the steering column is not limited to welding, and may be of any suitable form, such as bolt fastening or the like. In the embodiment of FIG. 5, the width dimension of the curling plate need not always be varied, but may be constant.

As described above, according to the present invention, in a tilt steering apparatus wherein a steering column is fixed to a vehicle body by a fastening bolt fastening a column bracket through a distance bracket secured to said column and wherein said fastening is released by a tilt lever having a nut portion threadably engaged with the fastening bolt to thereby make the column angularly adjustable in the vertical direction of the vehicle body, a curling plate restrained by a bent portion controlling guide member is provided between the fastening bolt and said column so that shock energy may be absorbed by the plastic deformation of said curling plate. In the present invention, as compared with a tilt steering apparatus of such a construction in which a corrugated or stretch tear type energy absorbing member is hooked between a fastening bolt and a hang pawl in the lower portion of a column, there is no creation of sounds by vibrations and no irregularity of the energy absorbing characteristic caused by the irregularity of the manufacture of the energy absorbing member, and a stable energy absorbing characteristic and a desired gradually increasing load characteristic are obtained. Also, in contrast to the prior-art apparatus in which an energy absorbing portion is provided in the portion wherein a column bracket is mounted to a vehicle body, the invention is not subject to the earlier-discussed great moment load during collision. Therefore, the maximum peak load can be reduced and thus, the load and injury to which the driver is subjected during accidental collision can be decreased. The structure of the entire steering apparatus for shock absorption also becomes compact and the steering apparatus can be made light in weight and inexpensive.

We claim:

1. A shock absorbing steering apparatus, comprising a steering column having a steering shaft pivotably supported thereon, a distance bracket secured to said steering column, a column bracket for fixing said steering column to a vehicle body through said distance bracket, and a shock energy absorbing U-shaped plate having a first plate portion, a second plate portion, and a bent portion integrally connecting said first and second plate portions, said first plate portion having an end secured to said steering column and said second plate portion having an end secured to said column bracket, such that when said shock energy absorbing plate is shocked, said end of said second plate portion moves a certain distance relative to said column bracket, and said shock energy absorbing plate plastically deforms so that said bent portion moves, thereby absorbing energy.

2. A shock absorbing steering apparatus according to claim 1, wherein said first and second plate portions are extended substantially along said column, and further comprising a guide member secured to said steering column for restraining said first and second plate portions of said U-shaped plate while said U-shaped plate deforms.

3. A shock absorbing steering apparatus according to claim 1, wherein the width of said first plate portion of said U-shaped plate changes gradually.

4. A shock absorbing steering apparatus according to claim 2, wherein the width of said first plate portion of said U-shaped plate changes gradually.

5. A shock absorbing steering apparatus, comprising a steering column supporting a steering shaft therein rotatably and tiltable in upward and downward directions of a vehicle, a distance bracket fixed to said steering column and including a bottom portion connecting a pair of side portions having respective rearwardly open cut-outs, a column bracket for fixing said steering column to a vehicle body through said distance bracket, fastening means extending laterally through said distance bracket and through said cut-outs and fastening said distance bracket to said column bracket, a U-shaped shock energy absorbing member having one end engaged with said fastening means and another end fixed to said steering column, and a guide member fixed on said steering column remote from said distance bracket to receive an intermediate U-shaped portion of said absorbing member, whereby when a shock is applied to said steering column in a longitudinal direction thereof, said steering column, said distance bracket, and said guide member shift relative to said column bracket, and said intermediate U-shaped portion of said absorbing member plastically deforms under guidance by said guide member.

6. A shock absorbing steering apparatus, comprising a steering column, column bracket means for attachment to a vehicle body and having side portions disposed to opposite sides of said steering column, distance bracket means fixed to said steering column and having opposite side portions disposed adjacent to said side portions of said column bracket means, respectively, said side portions of said distance bracket means having respective cut-outs extending longitudinally of said steering column, fastening means extending through said cut-outs and securing said steering column to said column bracket means through said distance bracket means, a U-shaped shock energy absorbing member having one end fixed to said steering column, another end engaged with said fastening means, and an intermediate U-shaped bent portion interconnecting said end portions, and guide means disposed to guidingly receive said intermediate portion of said absorbing member, whereby when said steering column is subjected to a longitudinal shock, said steering column and said distance bracket means shift relative to said column bracket means, and said absorbing member plastically deforms at said intermediate portion under guidance of said guide means.

7. A shock absorbing steering apparatus according to claim 6, wherein said guide means guides the deformation of said absorbing member such that a predetermined bend curvature is maintained in said intermediate portion.

8. A shock absorbing steering apparatus according to claim 7, wherein said guide means comprises a U-shaped guide member secured to said steering column with said intermediate portion of said absorbing member received between opposite legs of said guide member.

9. A shock absorbing steering apparatus according to claim 7, wherein said guide means comprises a forward extension of said distance bracket means extending longitudinally of said steering column.

10. A shock absorbing steering apparatus according to claim 6, wherein said another end of said absorbing member is of U-shaped transverse cross section and has opposite legs disposed respectively adjacent to said side portions of said distance bracket means and having respective openings through which said fastening means extends.

11. A shock absorbing steering apparatus according to claim 10, wherein said openings are constituted by slots extending longitudinally of said steering column, said slots being configured to permit a certain displacement of said absorbing member relative to said column bracket means when said steering column is subjected to a longitudinal shock.

12. A shock absorbing steering apparatus according to claim 10, wherein said one end of said absorbing member is of U-shaped transverse cross section and embraces a circumferential portion of said steering column.

13. A shock absorbing steering apparatus according to claim 6, wherein said intermediate portion of said absorbing member has a predetermined gradual change in width near said one end of said absorbing member, such that said absorbing member absorbs shock energy at a predetermined rate in accordance with said change in width.

* * * * *